Nov. 11, 1941.  W. RODDER ET AL  2,262,432
DRAWBENCH ARM MECHANISM
Filed Jan. 13, 1941  3 Sheets-Sheet 1
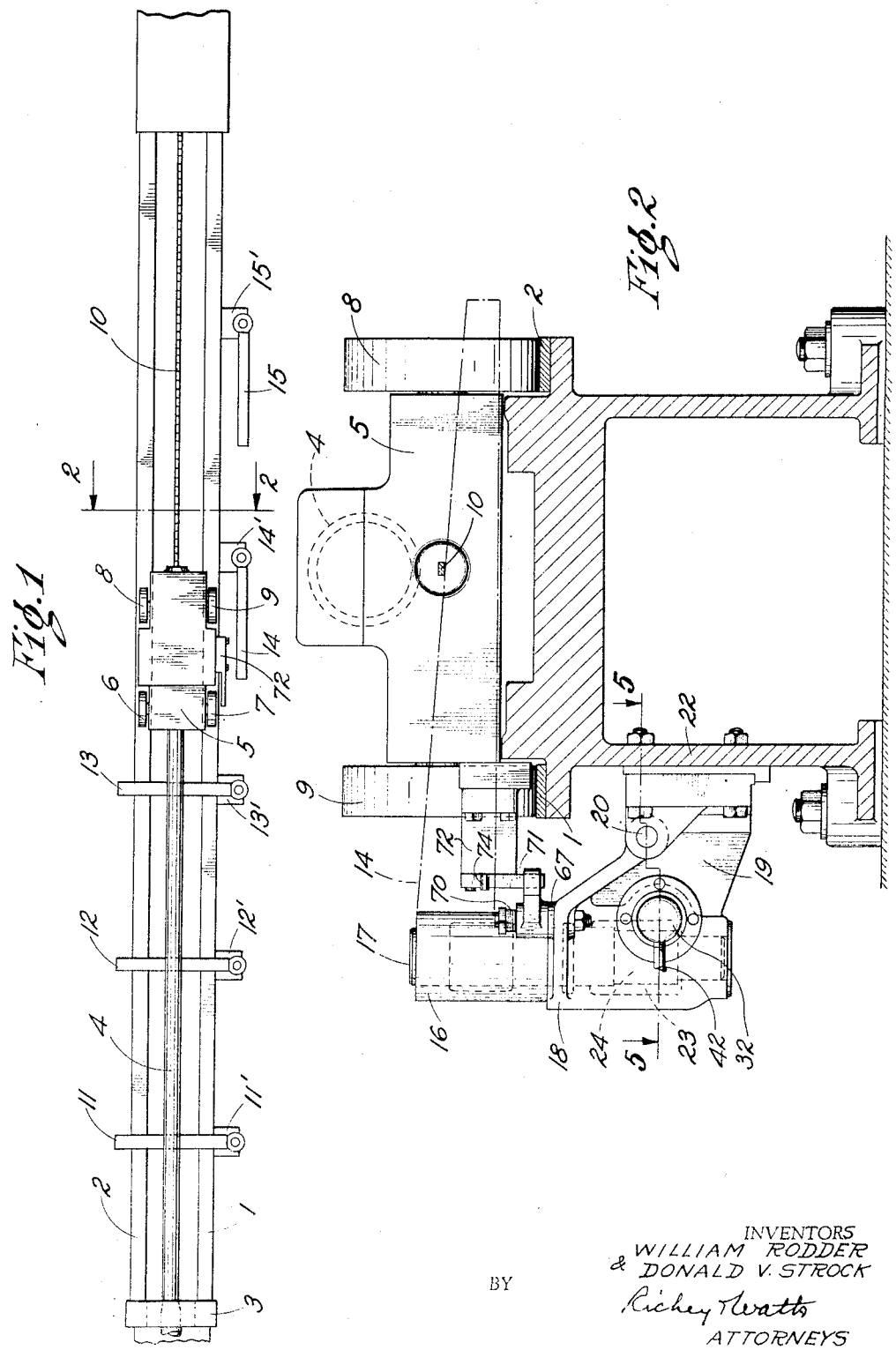
INVENTORS
WILLIAM RODDER
& DONALD V. STROCK
BY
Richey Watts
ATTORNEYS Nov. 11, 1941.   W. RODDER ET AL   2,262,432
DRAWBENCH ARM MECHANISM
Filed Jan. 13, 1941   3 Sheets—Sheet 3

INVENTORS
WILLIAM RODDER
& DONALD V. STROCK
BY
Richey & Watts
ATTORNEYS

Patented Nov. 11, 1941

2,262,432

UNITED STATES PATENT OFFICE 2,262,432

DRAWBENCH ARM MECHANISM

William Rodder and Donald V. Strock, Youngstown, Ohio, assignors to The Aetna-Standard Engineering Company, Youngstown, Ohio, a corporation of Ohio Application January 13, 1941, Serial No. 374,158

7 Claims. (Cl. 205—3)

This invention relates to apparatus for removing bars, tubes or the like from a draw bench after completion of the drawing operation.

In the usual form of draw bench used to reduce the diameter of bars or tubes by drawing through a die, a carriage, having gripping jaws which clamp an end of the articles to be drawn, is supported on tracks on the bench and adapted to be moved away from the die a distance sufficient to draw the entire length of the tube through the die. A free path must, of course, be provided for movement of the carriage over the tracks of the bench structure but, in order to facilitate removal of the drawn tube from the bench after it has been pulled through the die and released from the carriage gripping jaws, transversely extending skid arms have been provided which may be positioned across the draw bench tracks under the tube and are suitably inclined so that the tube will roll off the bench when released.

It is of course understood that bars, tubes, or other articles which can be processed on a draw bench are intended to be included when reference is made herein to "tubes."

It is among the objects of the present invention to provide operating mechanism for the discharge arms of a draw bench whereby drawing movement of the carriage over the bench is not obstructed but a series of discharge arms will successively swing into discharge position under the tube as the carriage moves along the bench during the drawing operation.

Other objects of our invention include:

The provision of a discharge arm operating mechanism of the type described in which fluid under pressure is employed to move the discharge arm and movement of the arms is cushioned and controlled by fluid pressure action; the provision of an extremely simple, rugged, and compact discharge arm operating mechanism which employs a minimum of moving parts and which is easily installed and operated; the provision of fluid pressure actuated discharge arm operating mechanisms arranged along a draw bench and provided with latch means whereby movement of the carriage controls the movement of the discharge arms into discharging position; and, the provision of control mechanism for draw bench discharge arms whereby all of the arms may be simultaneously returned to retracted or idle position.

The above and other objects of our invention will appear from the following description of one embodiment thereof, reference being had to the accompanying drawings in which:

Figure 1 is a diagrammatic fragmentary plan view of a draw bench showing our discharge arms in place and illustrating the draw bench carriage at a mid-position during its drawing movement on the bench.

Figure 2 is an enlarged transverse cross-sectional view of a draw bench and carriage embodying our improvements, taken approximately on line 2—2 of Figure 1.

Figure 3:
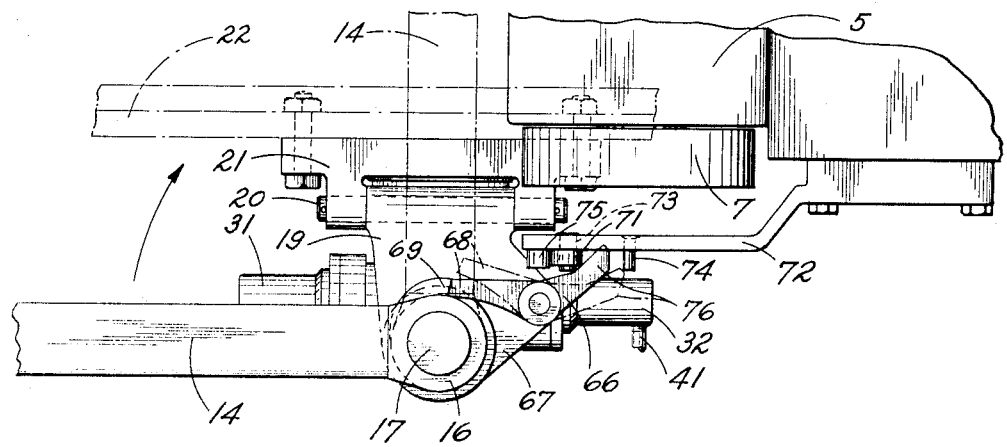
Figure 3 is a fragmentary plan view of the discharge arm operating mechanism and carriage structure shown in Figure 2.

In Figure 1 the draw bench rails or tracks are indicated at 1 and 2. The die 3 is adapted to reduce the diameter of a tube 4, the end of which is clamped in a suitable clamping means on the carriage 5 which in turn is supported on wheels 6, 7, 8 and 9 carried on the tracks 1 and 2.

The carriage 5 is operated by a chain 10 in well known manner which need not be described in detail here, and it will be understood that, when a tube is to be drawn through the die 3, its end is first crimped or reduced so that it can project through the die and the gripping jaws on the carriage 5 then grasp the end. The carriage is then hooked on to the chain 10 which moves in a direction to drive the carriage 5 to the right (Figure 1) drawing the tube 4 through the die.

At 11, 12, 13, 14 and 15 we have indicated discharge arms or skids for removing the drawn tube 4 from the bench. These arms are operated by mechanisms indicated at 11', 12', 13', 14' and 15'. Arms 11, 12 and 13 are shown in their discharging position (Figure 1), while arms 14 and 15 are still in their retracted or idle position, out of the way of the carriage 5 which has not yet moved beyond the last two skid arms.

As all of the discharge or skid arms and the operating mechanisms therefor are substantially identical only one arm and operating unit will be described in detail. Referring to Figures 2, 3, 4 and 5, the arm 14 is shown in its retracted position disposed parallel to the tracks 1 and 2 (except in Figure 2 where the arm 14 is indicated in dot and dash lines in the position it assumes when adapted to discharge the tube 4 from the bench). At the inner end of the arm 14 is a hub portion 16 which is mounted on and suitably secured to a vertical shaft 17. The lower end of the shaft 17 extends into and is supported by a bearing housing portion 18 on the supporting bracket 19 which, as illustrated, is pivotally mounted on a rod 20 carried in a bracket 21 secured to the side wall 22 of the draw bench. The bearing housing 18 has an enlarged recess or chamber portion 23 in which is disposed a gear section 24 of the shaft 17.

Figure 5:
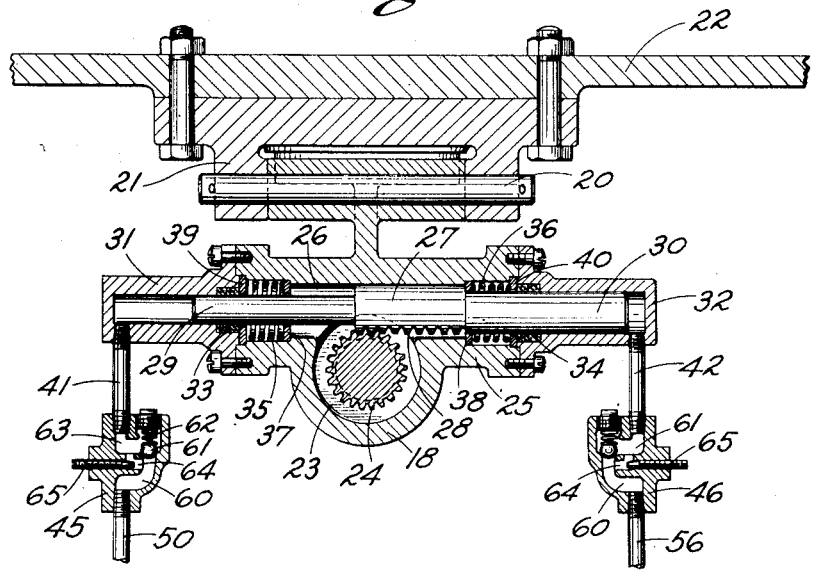
Figure 5 is a horizontal cross-sectional view taken substantially on line 5—5 of Figure 2 except that the parts are shown in the positions they assume when the discharge arm is in discharge position.

Extending transversely of the housing 18 is a tubular section 25 having a bore 26 in which a plunger member 27 has a sliding fit. One side of the plunger 27 is formed with rack teeth 28 which engage the teeth of the gear section 24 of shaft 17. Thus movement of the rack 27 will cause corresponding rotation of the shaft 17. As best seen in Figure 5, a small piston or plunger 29 extends from the left hand end of the rack section 27 and a large piston or plunger 30 extends from its right hand end. Cylinders 31 and 32 are secured to the ends of the tubular housing 25 and accommodate the pistons 29 and 30 respectively. Suitable packing rings 33 and 34 form the desired seal between the pistons and the cylinders, and cushioning springs 35 and 36 may be provided in enlarged recesses at the ends of the tubular housing 26. The washers 37 and 38 have sliding movement in the housing and the springs 35 and 36 abut against other washers 39 and 40 at their outer ends.

When the shoulder between the rack section 27 and the piston 30 strikes against the washers 38 (as in Figure 5) the impact is cushioned by the compression of the spring 36, and, in like manner, the spring 35 will cushion the movement in the opposite direction. This cushioning action tends to stop the mechanism without excessive jar, but, as will appear more fully later, may be omitted in some instances if desired due to the accurate control of the movement of the discharge arm by fluid pressure means.

Figure 6:
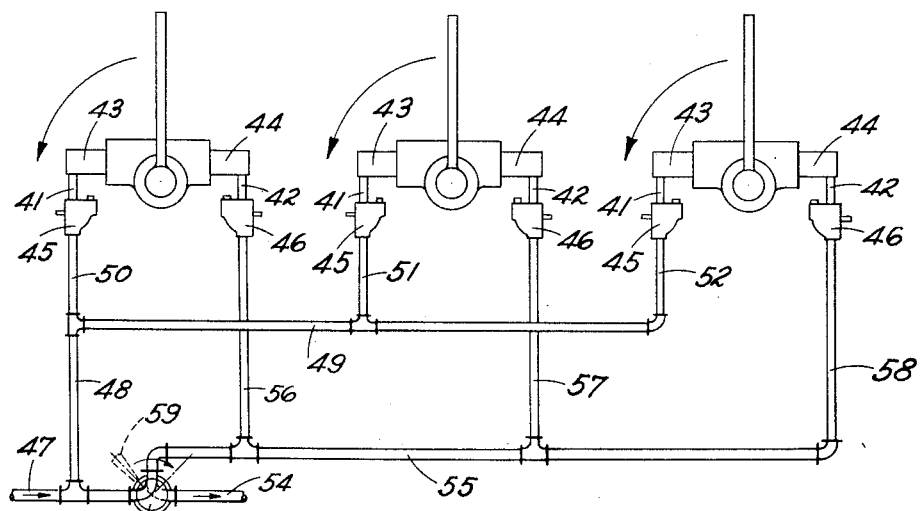
Figure 6 is a diagrammatic layout showing the piping and control valve arrangement for the fluid pressure hook-up to a series of our improved discharge arm mechanisms.

Connection to the small cylinder 31 is made through a pipe 41 and to the large cylinder 32 through the pipe 42. Referring to Figure 6, three discharge arms with their operating mechanisms are illustrated but it will be understood that five arms, as shown in Figure 1, or any other desired number, may be hooked up in similar manner. In Figure 6 the small cylinders of the operating mechanisms are indicated at 43 and the large cylinders at 44. Each of the pipes 41 leading to the small cylinders 43 is provided with a combined check and needle valve 45, and each of the pipes 42 leading to the large cylinders 44 is supplied with a similar combined check and needle valve 46. Air under pressure, from any suitable source, is supplied through a pipe 47 which branches at 48 and leads to each of the valves 45 through connecting pipes 49, 50, 51 and 52. The supply line 47 extends to a three way valve 53 having one outlet to the atmosphere through a pipe 54 and having another outlet connected to a header pipe 55 having branches 56, 57 and 58 extending to the valves 46 of the respective discharge arm operating units.

An operating handle for the control valve 53 is indicated at 59, and when the valve is in the position shown the pressure supply line 47 is connected to the header 55, and the atmospheric connection 54 is closed. If the handle 59 is moved through 90° to the right as indicated by the arrow, the valve will assume the position shown in dotted lines in Figure 6 and the supply line 47 will be closed at the valve and the header 55 will be opened to the atmosphere through pipe 54. Pressure is applied to each of the valves 45 at all times as there is a direct connection from the supply line 47 to each of these valves.

Referring to Figure 5, it will be seen that the supply pipe 50 leads to a passage or chamber 60 in the valve 45. At the end of this chamber 60 there is a ball check valve 61 held against a suitable seat by a light spring 62. Thus air may pass freely from the passage 60 to the chamber 63 of the valve 45 and from there on into the cylinder 31. An auxiliary passage 64 extends from chamber 60 to chamber 63 and provides a restricted outlet orifice which is controlled by the adjustable needle valve 65. It will be seen that valve 45 as a unit permits the free flow of air from the pipe 50 toward the cylinder 31 but restricts the flow in the opposite direction because, when air flows in said opposite direction the check valve 61 seats and the main passage through the valve is closed. Air, however, can escape through the by-pass passage 64. The flow through the passage 64 is restricted to the desired extent by the adjustable needle valve 65.

The valves 46 are constructed in the same manner as just described in referring to valves 45 and free passage of air from the pipe 56 to the cylinder 32 (Figure 5) is permitted while outflow of air from the cylinder 32 is restricted by the needle valve 65 of the check valve 46. The valves 45 and 46 of each discharge arm operating unit are arranged in the manner just described.

Air under operating pressure is always admitted to the small cylinders 31 and, when the valve 53 is in the position shown in Figure 6, air under operating pressure is also admitted to the large cylinders 32. Due to the difference in area of these cylinders the pistons 29 and 30 will be moved to the left from the position shown in Figure 5 and the discharge arm, which is mounted on the top of the shaft 17, will be moved counter-clockwise, as indicated by the arrow in Figure 6, into retracted position.

Figure 4:
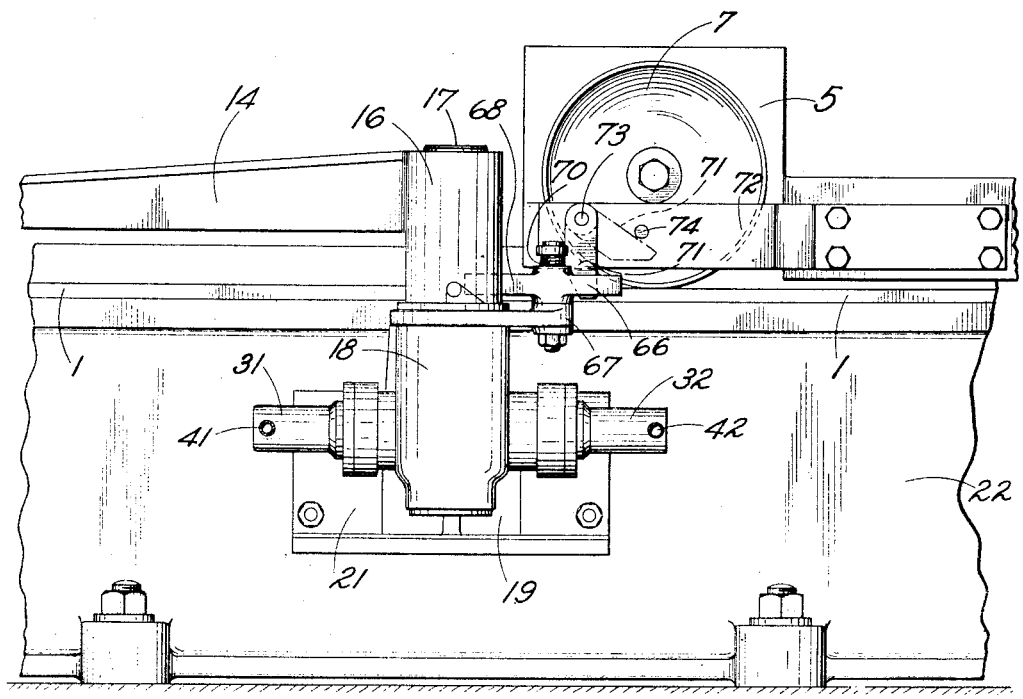
Figure 4 is a side elevation of the apparatus shown in Figures 2 and 3.

Latch means are provided for locking the discharge arms in their retracted position. As seen in Figures 2, 3 and 4 a pawl member 66 is pivotally supported on a bracket 67 which forms a part of the support member 19. The inner end 68 of the pawl 66 engages a projecting lug 69 on the hub 16 of the discharge arm and a torsion spring 70 tends at all times to turn the pawl 66 in counter-clockwise direction and hold the end 68 in position to engage the lug 69. As seen in Figure 3 the end 68 is in latching position holding the arm 14 in retracted position. A tripping dog 71 is secured to an arm 72 mounted on the side of the carriage 5, and this dog 71 is pivotally supported at 73. A stop pin 74 limits the upward swinging movement of the dog 71, and a stop block 75 (see Figure 3) prevents movement of the dog in the opposite direction beyond its vertical position.

Assuming that the carriage 5 in Figures 3 and 4 is moving to the right during the drawing of a tube, and that control valve 53 is in the dotted line position of Figure 6, the dog 71 is just about to strike the end portion 76 of the latch 66. As the carriage continues to move the dog 71 will swing the latch 66 into the position shown in dot and dash lines, releasing the arm 14 and permitting it to be moved into discharging position by the action of the piston 29 in the small cylinder 31, as will be explained more fully later. As the carriage goes on past the latch 66 the dog 71 will snap over the end of the latch. When the carriage arrives at each of the discharge arm operating devices the dog 71 will kick out each latch in turn, thus permitting the discharge arms to be swung successively into discharging position just as soon as the carriage passes by.

In the operation of our improved apparatus, after a tube has been drawn and each of the discharge arms has been moved into discharge position transversely of the draw bench, and after the tube has been conveyed out of the way by the discharge arms, the operator turns the valve 53 into the position shown in full lines in Figure 6. When in this position air under pressure is applied to the large cylinder of each arm operating unit, and the large piston 30 of each unit moves to the left to swing its discharge arm through 90° into retracted position. During this movement the small piston 29 also moves to the left and the air in the cylinder 31 escapes through the controlled outlet 64 and is backed up into the air supply pipe. By regulating the needle valves 65 of the check valves 45 the speed of the retracting swing of the arms can be regulated as the piston 29 cannot move to the left, any faster than is permitted by the escape of air through the orifice at the needle valve 65. Thus the retracting travel of the discharge arms is controlled and cushioned so that a rapid but smooth and easy operation is obtained.

When each discharge arm reaches its fully retracted position the end 68 of a pawl 66 snaps into locking position as seen in Figure 3 and prevent return movement of the arm into discharge position.

The carriage 5 may now be returned to the die 3 to grip another tube and during this return movement the dog 71 will strike the projecting ends 76 of each of the pawl members 66 but will pass freely thereover as the dog 71 may swing on its pivot 73 to pass by the pawls on the return movement of the carriage. This swinging of the dog 71 is indicated in dot and dash lines in Figure 4, and the pin 74 prevents excessive swinging movement of the dog 71.

After the carriage has been completely retracted and is positioned adjacent to the die 3, or at any other time after each of the discharge arms has been retracted and latched, the operator may move the valve 53 through 90° into the position shown in dotted lines in Figure 6. When in this position air under pressure is connected to each of the small cylinders 43 but each of the large cylinders 44 is connected to the atmosphere. Thus, as soon as the latch 66 of any one of the discharge arm units is kicked out by the dog 71 the air pressure operating against the small cylinder 29 will move this cylinder to the right (Figure 5) moving the shaft 17 and the discharge arm carried thereby through 90° into discharging position. During this movement of the piston 29 the large piston 30 has a corresponding movement and air is discharged from the large cylinder through the port 64 in the check valve 46. The flow through the port 64 may be adjusted by the needle valve 65 as described above, and thus sufficient resistance may be imposed upon movement of the double ended piston assembly to control the swing of the discharge arms and prevent excessive shock and wear and tear on the apparatus. The spring cushions 35 and 36 also assist in preventing excessive shock at the ends of the movement of the discharge arm.

The pivotal support of each arm 14 and its operating mechanism on the rods 20 permits the weight of the drawn pipe or bar, when resting on the arm 14, to move the bottom of the arm into contact with the top of the drawbench. As seen in Figure 2, the arm 14 is not touching the drawbench and thus free swinging of the arm in a substantially horizontal plane is permitted. When a heavy drawn tube or the like rests on the top of arm 14 the entire arm and operating assembly is moved slightly about its pivotal support 20 until the bottom of the arm 14 rests on and is firmly supported by the top longitudinal members of the draw bench. As soon as the drawn article rolls off of the inclined upper faces of the arm the weight of the arm operating mechanism returns the arm to the position of Figure 2. It will be understood that the movement about pivot 20 is slight and is not sufficient to affect the proper operation of any of the parts.

After a drawing operation is completed and the discharge arms have served their function the operator merely moves the control valve 53 to cause all of the arms to be retracted simultaneously and locked in retracted position. He may then immediately return the valve 53 to the position where the small pistons are subjected to operating pressure and the large pistons connected to atmosphere, so that, as soon as each latch 66 is kicked out, the corresponding arm will swing into discharging position.

With our improved apparatus an exceedingly simple operation of the discharge arms is provided. A single valve controls the entire series of arms and the successive swinging of the arms into discharge position is entirely automatically controlled by the movement of the carriage. Although specific reference has been made herein to air under pressure as the actuating fluid, oil or other suitable fluid may be used if desired.

Although we have described the illustrated embodiment of our invention in considerable detail, it will be understood by those skilled in the art that modifications and variations may be made in the form of the apparatus employed. We do not therefore wish to be limited to the exact arrangement and construction herein shown and described, and claim as our invention all embodiments thereof coming within the scope of the appended claims.

We claim:

1. In apparatus of the type described, a draw bench, a series of discharge arms having inclined upper surfaces spaced along said draw bench, means for supporting said arms for movement in a substantially horizontal plane into and out of discharging position transversely of said draw bench, individual fluid pressure actuated means for moving each of said arms independently from retracted into discharging position, a carriage movable on said draw bench, means on said carriage for controlling the operation of said fluid pressure actuated means for moving said discharge arms from retracted into operating position, individual fluid pressure actuated means for moving each of said discharge arms from discharge into retracted position, and a common control means whereby all of said last named fluid pressure actuated means may be operated to retract all of said discharge arms simultaneously.

2. In apparatus of the type described, a draw bench, a carriage supported for movement longitudinally of said bench, a discharge arm pivotally supported at one side of said bench for movement in a substantially horizontal plane, said arm having an inclined upper surface, fluid pressure actuated means tending at all times during operation of the apparatus to swing said arm into discharging position transversely of said bench, fluid pressure actuated means adapted to overcome said first named fluid pressure actuated means and swing said arm from discharging into retracted position, means for locking said arm in retracted position, means on said carriage for releasing said locking means, and means for conducting fluid under pressure to said arm operating means.

3. In apparatus of the type described, a draw bench, a carriage supported for movement longitudinally of said bench, a discharge arm having an inclined upper surface pivotally supported at one side of said bench for movement in a substantially horizontal plane, fluid pressure actuated means tending at all times during operation of the apparatus to swing said arm into discharging position transversely of said bench, fluid pressure actuated means adapted to overcome said first named fluid pressure actuated means and swing said arm from discharging into retracted position, means for locking said arm in retracted position, means on said carriage for releasing said locking means, means for conducting fluid under pressure to said arm operating means, means for restricting the flow of fluid under pressure from said arm operating means, and valve means for controlling the application of operating pressure to said means for moving said arm from discharging into retracted position.

4. Discharge arm mechanism including an arm having an inclined upper surface, a shaft supporting said arm for swinging movement in a substantially horizontal plane, a pair of cylinders one larger in diameter than the other, pistons in said cylinders, operating connections between said pistons and said shaft, a fluid pressure conducting conduit leading to the smaller of said cylinders, a fluid pressure conducting conduit leading to the larger of said cylinders, valve means in said second fluid pressure conduit, means for supplying fluid under pressure to said conduits, said valve means being adapted to disconnect said large cylinder from the fluid pressure supply and connect it to atmosphere when in one position and to close the atmospheric connection and connect said large cylinder directly to the pressure supply when in another position, and disengageable latch means for retaining said arm in retracted position.

5. Discharge arm mechanism including an arm having an inclined upper surface, a shaft supporting said arm for swinging movement in substantially horizontal plane, a pair of cylinders one larger in diameter than the other, pistons in said cylinders, operating connections between said pistons and said shaft, a fluid pressure conducting conduit leading to the smaller of said cylinders, a fluid pressure conducting conduit leading to the larger of said cylinders, valve means in said second fluid pressure conduit, means for supplying fluid under pressure to said conduits, said valve means being adapted to disconnect said large cylinder from the fluid pressure supply and connect it to atmosphere when in one position and to close the atmospheric connection and connect said large cylinder directly to the pressure supply when in another position, disengageable latch means for retaining said arm in retracted position, and means for controlling the discharge of fluid from said cylinders whereby the rate of swinging movement of said arm is controlled.

6. In apparatus of the type described, a draw bench, a carriage supported on said bench, a discharge arm having an inclined upper surface, a support for said arm whereby it may be moved only in a substantially horizontal plane into and out of discharging position, means tending at all times during operation of the apparatus to move said arm into discharging position, retracting means for moving said arm out of discharging position into retracted position, means for locking said arm in retracted position, release means on said carriage for releasing said locking means as said carriage moves in drawing direction on said bench, and control means for said retracting means.

7. In apparatus of the type described, a drawbench, a carriage supported for movement longitudinally of said bench, a discharge arm pivotally supported at one side of said bench for movement in a substantially horizontal plane, said arm having an inclined upper surface, fluid pressure actuated means tending at all times during the operation of the apparatus to swing said arm into discharging position transversely of said bench, fluid pressure actuated means adapted to overcome said first named fluid pressure actuated means and swing said arm in a substantially horizontal plane from discharging into retracted position, means for locking said arm in retracted position, means on said carriage for releasing said locking means, means for conducting fluid under pressure to said arm operating means, and means for pivotally suporting said fluid pressure actuated means and said arm on said drawbench whereby the weight of said fluid pressure actuated means will normally hold said arm out of engagement with the top of said drawbench, but said arm may be moved downwardly into contact with the top of said drawbench when a drawn article is disposed on said arm.

WILLIAM RODDER.
DONALD V. STROCK.